R. W. Carpenter.
Tremolo for Organs.
N° 87,395. Patented Mar. 2, 1869.
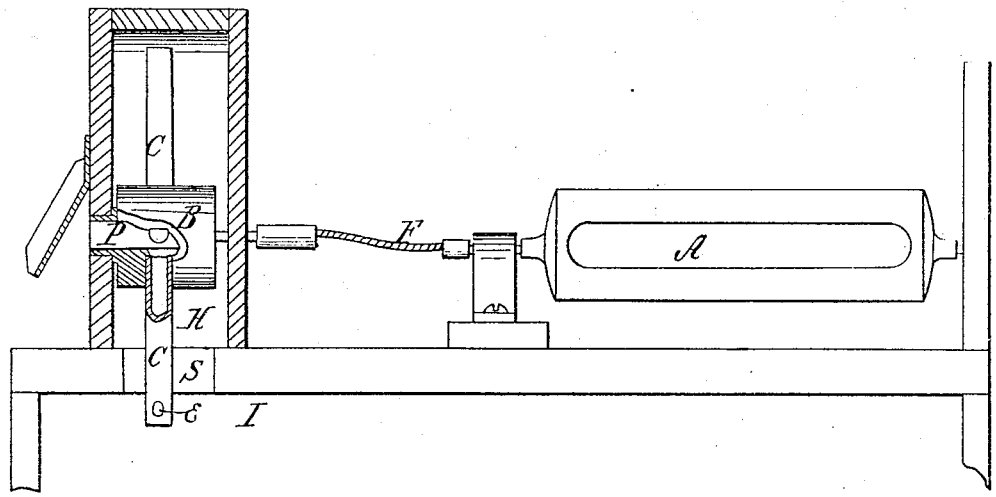
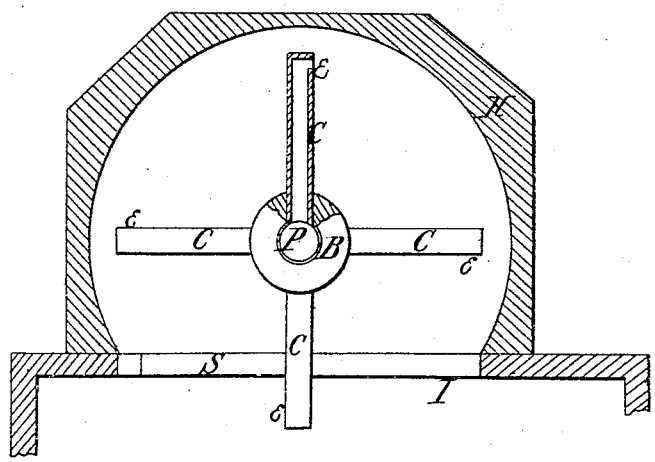
Witnesses:
R. S. Turner.
J. S. Brown.
Inventor:
R. W. Carpenter
By his atty
R. D. O. Smith

UNITED STATES PATENT OFFICE.

RILEY W. CARPENTER, OF CHICAGO, ILLINOIS.

MODE OF OPERATING TREMOLOS IN ORGANS.

Specification forming part of Letters Patent No. 87,395, dated March 2, 1869.

*To all whom it may concern:*

Be it known that I, RILEY W. CARPENTER, of Chicago, in the county of Cook and State of Illinois, have invented a new and useful Improved Mode of Operating Tremolos in Reed or other Organs; and I do hereby declare the following to be a full, clear, and exact description of the same, reference being had to the accompanying drawings, in which—

Figure 1 is a side sectional elevation of my invention. Fig. 2 is an elevation of the operating-wheel.

That others may understand its construction and operation, I will particularly describe it.

A is the tremolo, which may be constructed in some approved way to produce the desired effect.

The tremolo shown is that heretofore patented to me, and represents the construction which I prefer; but any other revolving tremolo will be operated by my device equally well, and I therefore do not limit myself to its connection with any particular tremolo. B is a reaction-wheel, constructed by inserting in the sides of a hollow or tubular hub the tubular arms C C, projecting at right angles to the axis of said hub. The arms C C are closed at their outer ends, but have small openings e at the side of each near the end, and said openings in the several arms are in the same direction—that is, they are at the rear side as the wheel moves forward. The hollow of each arm communicates with the hollow part of the hub, and the open end of this latter projects through the side of the air-box H, in which the wheel B is hung so as to revolve freely. The air-box H communicates with the bellows or air-chamber I of the instrument in such a way that when the bellows is operated the air is exhausted from the box H, and a current is formed from the outside through the hollow hub and arms of the wheel B, the same escaping into the air-box through the openings E. The effect of this current is to cause a rapid rotation of the wheel B upon its axis according to the well-known principles of the reaction-wheel.

A suitable valve will be easily adjusted to arrest this flow of air at any time when it is desirable that the tremolo should not operate—as, for instance, a valve may close the opening P into the hub of the wheel B; or a valve may close the communicating-passage S between the chambers H and I.

A dense cord, F, of any proper description—as, for instance, the kind known as "curtain-cord," or a cord wound with fine wire, or any other description of flexible connection—may be conveniently used to communicate motion from the wheel B to the tremolo A; or, if convenient, the axis of the wheel and tremolo may be coincident, and connect directly with the shaft of the air-wheel. The connection formed by a flexible cord or its equivalent is, however, to be preferred.

It is manifest that the action of the wheel B may be reversed—*i. e.*, operated by air forced in by the bellows at the opening P, or by the action of the bellows drawing the air in at the openings E and exhausting it through the hub at P. The latter would be the case were the wheel hung outside of the air-box H, and in neither of these cases would there be any change in the effect produced.

The chief advantages of this device to operate the tremolo are rapidity and sensibility of action, and a material reduction in the quantity of air required to operate the tremolo. This last is of the greatest consequence.

It is evident that this device may be used in connection with any musical instrument employing a bellows.

Having described my invention, what I claim as new is—

1. In combination with the wheel B, constructed and operating as set forth, the tremolo A of an organ or other musical instrument having a bellows.

2. In combination with the wheel B, or its equivalent, and the tremolo A, the flexible connection F, substantially as and for the purpose set forth.

R. W. CARPENTER.

Witnesses:
F. J. BURDITT,
H. O. HEDGE.